United States Patent
Hayashi

(10) Patent No.: US 8,863,169 B2
(45) Date of Patent: Oct. 14, 2014

(54) CONTENT TRANSMISSION DEVICE, PROGRAM, PARENTAL LEVEL DETERMINATION METHOD, AND CONTENT TRANSMISSION SYSTEM

(75) Inventor: Morihiko Hayashi, Kanagawa (JP)

(73) Assignee: Sony Corporation (JP)

( * ) Notice: Subject to any disclaimer, the term of this patent is extended or adjusted under 35 U.S.C. 154(b) by 986 days.

(21) Appl. No.: 12/381,263

(22) Filed: Mar. 10, 2009

(65) Prior Publication Data

US 2009/0235300 A1  Sep. 17, 2009

(30) Foreign Application Priority Data

Mar. 12, 2008  (JP) ............... P2008-063351

(51) Int. Cl.
| | |
|---|---|
| H04N 7/16 | (2011.01) |
| H04H 60/33 | (2008.01) |
| H04H 60/56 | (2008.01) |
| H04N 21/8355 | (2011.01) |
| H04N 21/475 | (2011.01) |
| H04N 21/41 | (2011.01) |
| H04N 21/436 | (2011.01) |
| H04N 21/442 | (2011.01) |
| H04N 21/454 | (2011.01) |
| H04N 21/262 | (2011.01) |
| H04N 21/422 | (2011.01) |
| H04N 21/45 | (2011.01) |
| H04N 7/173 | (2011.01) |
| H04N 21/466 | (2011.01) |

(52) U.S. Cl.
CPC ............ *H04N 7/165* (2013.01); *H04N 21/8355* (2013.01); *H04N 21/4751* (2013.01); *H04N 21/4755* (2013.01); *H04N 7/166* (2013.01); *H04N 21/4122* (2013.01); *H04N 21/43615* (2013.01); *H04N 21/44218* (2013.01); *H04N 21/4542* (2013.01); *H04N 21/26208* (2013.01); *H04N 21/42202* (2013.01); *H04N 21/4532* (2013.01); *H04N 7/17354* (2013.01); *H04N 21/4668* (2013.01)

USPC .............................................. 725/25; 725/12

(58) Field of Classification Search
USPC ...................................................... 725/12, 25
See application file for complete search history.

(56) References Cited

U.S. PATENT DOCUMENTS 7,134,130 B1  11/2006 Thomas
2003/0028622 A1*  2/2003 Inoue et al. ................ 709/219

(Continued)

FOREIGN PATENT DOCUMENTS

| EP | 1530115 A2 | 5/2005 |
| JP | 2002-112218 A | 4/2002 |

(Continued)

OTHER PUBLICATIONS

European Search Report, EP 09 15 4962, dated Oct. 30, 2009.

*Primary Examiner* — Ricky Chin
(74) *Attorney, Agent, or Firm* — Lerner, David, Littenberg, Krumholz & Mentlik, LLP

(57) ABSTRACT

A content transmission device that is connected to a plurality of external devices including a reproduction device reproducing content data, including a transmitting section transmitting content data to the reproduction device, a detecting section detecting the state of each of the plurality of external devices, a parental level determining section determining for the reproduction device a boundary between a parental level on content data the viewing of which is restricted and a parental level on content data the viewing of which is allowed according to the state of each of the plurality of external devices detected by the detecting section, and a control section controlling transmission of content data from the transmitting section based on the relation between the boundary determined by the parental level determining section and a parental level set on content data.

9 Claims, 14 Drawing Sheets

(56) References Cited

U.S. PATENT DOCUMENTS

| | | | |
|---|---|---|---|
| 2003/0028883 A1* | 2/2003 | Billmaier et al. | 725/46 |
| 2003/0237093 A1* | 12/2003 | Marsh | 725/46 |
| 2004/0117831 A1 | 6/2004 | Ellis et al. | |
| 2005/0060740 A1* | 3/2005 | Stecyk | 725/28 |
| 2005/0240959 A1* | 10/2005 | Kuhn et al. | 725/25 |
| 2008/0022322 A1* | 1/2008 | Grannan et al. | 725/78 |
| 2008/0172689 A1* | 7/2008 | Feder et al. | 725/28 |
| 2009/0133049 A1* | 5/2009 | Bradley | 725/28 |
| 2011/0121938 A1* | 5/2011 | Slemmer et al. | 340/3.1 |
| 2012/0060181 A1* | 3/2012 | Craner | 725/28 |

FOREIGN PATENT DOCUMENTS

| | | |
|---|---|---|
| JP | 2005-348035 A | 12/2005 |
| JP | 2006-197432 A | 7/2006 |
| JP | 2007-074036 A | 3/2007 |
| JP | 2007-243879 A | 9/2007 |
| JP | 2008-005403 A | 1/2008 |
| WO | 2004098190 A1 | 11/2004 |
| WO | 2007036891 A2 | 4/2007 |

* cited by examiner

FIG.6

| DEVICE NAME | DEVICE ID | IP ADDRESS | RESTRICTION STANDARD |
|---|---|---|---|
| TV IN LIVING ROOM | 30A | 192.xxx.aaa·· | — |
| TV IN CHILDREN'S ROOM | 30B | 192.xxx.bbb·· | — |
| TV IN BEDROOM | 30C | 192.xxx.ccc·· | — |

FIG.10

| DEVICE NAME | DEVICE ID | IP ADDRESS | RESTRICTION STANDARD |
|---|---|---|---|
| TV IN LIVING ROOM | 30A | 192.xxx.aaa·· | R14 WHEN TV IN BEDROOM IS ON<br>R20 WHEN TV IN CHILDREN'S ROOM IS ON |
| TV IN CHILDREN'S ROOM | 30B | 192.xxx.bbb·· | — |
| TV IN BEDROOM | 30C | 192.xxx.ccc·· | — |

CONTENT TRANSMISSION DEVICE, PROGRAM, PARENTAL LEVEL DETERMINATION METHOD, AND CONTENT TRANSMISSION SYSTEM

CROSS REFERENCES TO RELATED APPLICATIONS

The present application claims priority from Japanese Patent Application No. JP 2008-063351, filed in the Japanese Patent Office on Mar. 12, 2008, the entire content of which is incorporated herein by reference.

BACKGROUND OF THE INVENTION

1. Field of the Invention

The present invention relates to a content transmission device, a program, a parental level determination method, and a content transmission system.

2. Description of the Related Art

In recent years, a technology is drawing attention which configures a home network by interconnecting devices at home. As the devices at home, there are, for example, a personal computer (PC), a television (TV), a content storage device storing content data such as video and audio, a content reproduction device reproducing content data, and the like.

Further, there is a case where a parental level is set on content data so that, for example, children under 18 can be kept from viewing content data including violence or sexual portrayal. In this case, by restricting the reproduction by a content reproduction device, that is used by children, of content data on which the parental level is set, children can be protected from harmful content data.

For example, JP-A-2006-197432 describes a system where a front monitor is provided for front seats of a vehicle and a rear monitor is provided for rear seats, and a parental level that is different from that of the front monitor is applied to the rear monitor. According to such system, since content data on which a predetermined parental level is set is not reproduced on the rear monitor, children who generally sit in the rear seats can be protected from such content data. Further, parents who generally sit in the front seats can view as usual content data on which a parental level is set.

SUMMARY OF THE INVENTION

However, in homes, a user of each content reproduction device is not specified, and thus, when applying the system of the related art to a home network, restriction on the reproduction of content data cannot be performed appropriately. For example, since a content reproduction device in a living room is used by parents and children, when a fixed parental level is applied for the content reproduction device in the living room, an inconvenience may occur that children view content data on which a parental level is set or that parents cannot view the content data.

Thus, in view of the foregoing, it is desirable to provide a new and improved a content transmission device, a program, a parental level determination method, and a content transmission system capable of flexibly changing for a reproduction device the parental level for content data the viewing of which is to be allowed or restricted.

According to an embodiment of the present invention, there is provided a content transmission device that is connected to a plurality of external devices including a reproduction device reproducing content data, including a transmitting section transmitting content data to the reproduction device, a detecting section detecting the state of each of the plurality of external devices, a parental level determining section determining for the reproduction device a boundary between a parental level on content data the viewing of which is restricted and a parental level on content data the viewing of which is allowed according to the state of each of the plurality of external devices detected by the detecting section, and a control section controlling transmission of content data from the transmitting section based on the relation between the boundary determined by the parental level determining section and a parental level set on content data.

With such a configuration, the boundary of parental level for the reproduction device changes according to the state of each of the plurality of external devices. As such, the content transmission device can flexibly change for the reproduction device the parental level for content data the viewing of which is to be allowed or restricted, and thus, even if the user of the reproduction device is not specified, viewing of content data can be appropriately restricted for each user.

The external device may include the reproduction device and another reproduction device, the detecting section may detect the ON-OFF state of power of the other reproduction device, and the parental level determining section may determine the boundary for the reproduction device according to the ON-OFF state of the other reproduction device detected by the detecting section.

For example, when it is detected by the detecting section that the power of the other reproduction device is ON, the parental level determining section may lower the boundary for the reproduction device. With such a configuration, when it is detected by the detecting section that the power of the other reproduction device is ON, the parental level determining section lowers the upper limit of the parental level on content data the viewing of which is allowed on the reproduction device. Here, when the user of the other device is specified to be a grown up and power of the other reproduction device is ON, it is highly probable that the user of the reproduction device at the time is a child. In this case, as described above, with the parental level determining section lowering the upper limit of parental level on content data the viewing of which is allowed on the reproduction device, children can be effectively protected from inappropriate content data.

Further, when it is detected by the detecting section that the power of the other reproduction device is ON, the parental level determining section may raise the boundary for the reproduction device. With such a configuration, when it is detected by the detecting section that the power of the other reproduction device is ON, the parental level determining section raises the upper limit of the parental level on content data the viewing of which is allowed on the reproduction device. Here, when the user of the other device is specified to be a child and power of the other reproduction device is ON, it is highly probable that the user of the reproduction device at the time is a grown up. In this case, as described above, with the parental level determining section raising the upper limit of parental level on content data the viewing of which is allowed on the reproduction device, it can be prevented that a grown up is overly restricted from viewing content data.

The external device may include the reproduction device and an optical sensor sensing light, the detecting section may detect the sensed state of light by the optical sensor, and the parental level determining section may determine the boundary for the reproduction device according to the sensed state of light detected by the detecting section. With such a configuration, when the light of a room in which the optical sensor is placed is on, the optical sensor senses the light.

Further, there is a possibility that the light is turned on when there is a person in a room in which the optical sensor is placed. Accordingly, when the user of a room in which the optical sensor is placed is specified and light is detected by the optical sensor, the possibility is higher that the user of the reproduction device at the time is a grown up or that the user is a child. Thus, by determining the boundary of parental level for the reproduction device according to the sensed state of light detected by the detecting section, the parental level determining section can more appropriately apply to the user of the reproduction device the parental level relating to the viewing of content data.

The parental level determining section may further determine the boundary for the reproduction device according to a current time. With such a configuration, when the user of the reproduction device varies depending on time, it becomes possible to apply to each user a parental level appropriate to the user.

The content transmission device may further include an input section to which a determination standard of the parental level determining section for the boundary is input by a user, and the parental level determining section may determine the boundary for the reproduction device based on the determination standard input to the input section.

According to another embodiment of the present invention, there is provided a program causing a computer provided in a content transmission device which is connected to a plurality of external devices including a reproduction device reproducing content data and which includes a transmitting section transmitting content data to the reproduction device to function as a detecting section detecting the state of each of the plurality of external devices, a parental level determining section determining for the reproduction device a boundary between a parental level on content data the viewing of which is restricted and a parental level on content data the viewing of which is allowed according to the state of each of the plurality of external devices detected by the detecting section, and a control section controlling transmission of content data from the transmitting section based on the relation between the boundary determined by the parental level determining section and a parental level set on content data.

Such a program can cause computer hardware resources including, for example, a CPU, a ROM, a RAM, and the like, to execute the functions of the parental level determining section and the control section described above. That is, it becomes possible to cause a computer using the program to function as the parental level determining section and the control section described above.

According to another embodiment of the present invention, there is provided a parental level determination method executed by a content transmission device which is connected to a plurality of external devices including a reproduction device reproducing content data, including the steps of detecting the state of each of the plurality of external devices, determining for the reproduction device a boundary between a parental level on content data the viewing of which is restricted and a parental level on content data the viewing of which is allowed according to the state of each of the plurality of external devices, and controlling transmission of content data from the transmitting section based on the relation between the determined boundary and a parental level set on content data.

According to another embodiment of the present invention, there is provided a content transmission system including a plurality of external devices including a reproduction device reproducing content data and a content transmission device that is connected to the plurality of external devices. To describe in more detail, the content transmission device includes a transmitting section transmitting content data to the reproduction device, a detecting section detecting the state of each of the plurality of external devices, a parental level determining section determining for the reproduction device a boundary between a parental level on content data the viewing of which is restricted and a parental level on content data the viewing of which is allowed according to the state of each of the plurality of external devices detected by the detecting section, and a control section controlling transmission of content data from the transmitting section based on the relation between the boundary determined by the parental level determining section and a parental level set on content data.

With such a configuration, the boundary of parental level for the reproduction device changes according to the state of each of the plurality of external devices. As such, with the content transmission system, the parental level for content data the viewing of which is to be allowed or restricted is flexibly changed for the reproduction device, and thus, even if the user of the reproduction device is not specified, viewing of content data can be appropriately restricted for each user.

According to the embodiments of the present invention described above, the parental level for content data the viewing of which is to be allowed or restricted can be flexibly changed for the reproduction device.

BRIEF DESCRIPTION OF THE DRAWINGS

FIG. 6 is an explanatory diagram showing a concrete example of a device list including device information of each reproduction device obtained by a standard setting section.

FIG. 10 is an explanatory diagram showing a concrete example of a device list after the setting of restriction standard.

DETAILED DESCRIPTION OF THE PREFERRED EMBODIMENTS

Figure 1:
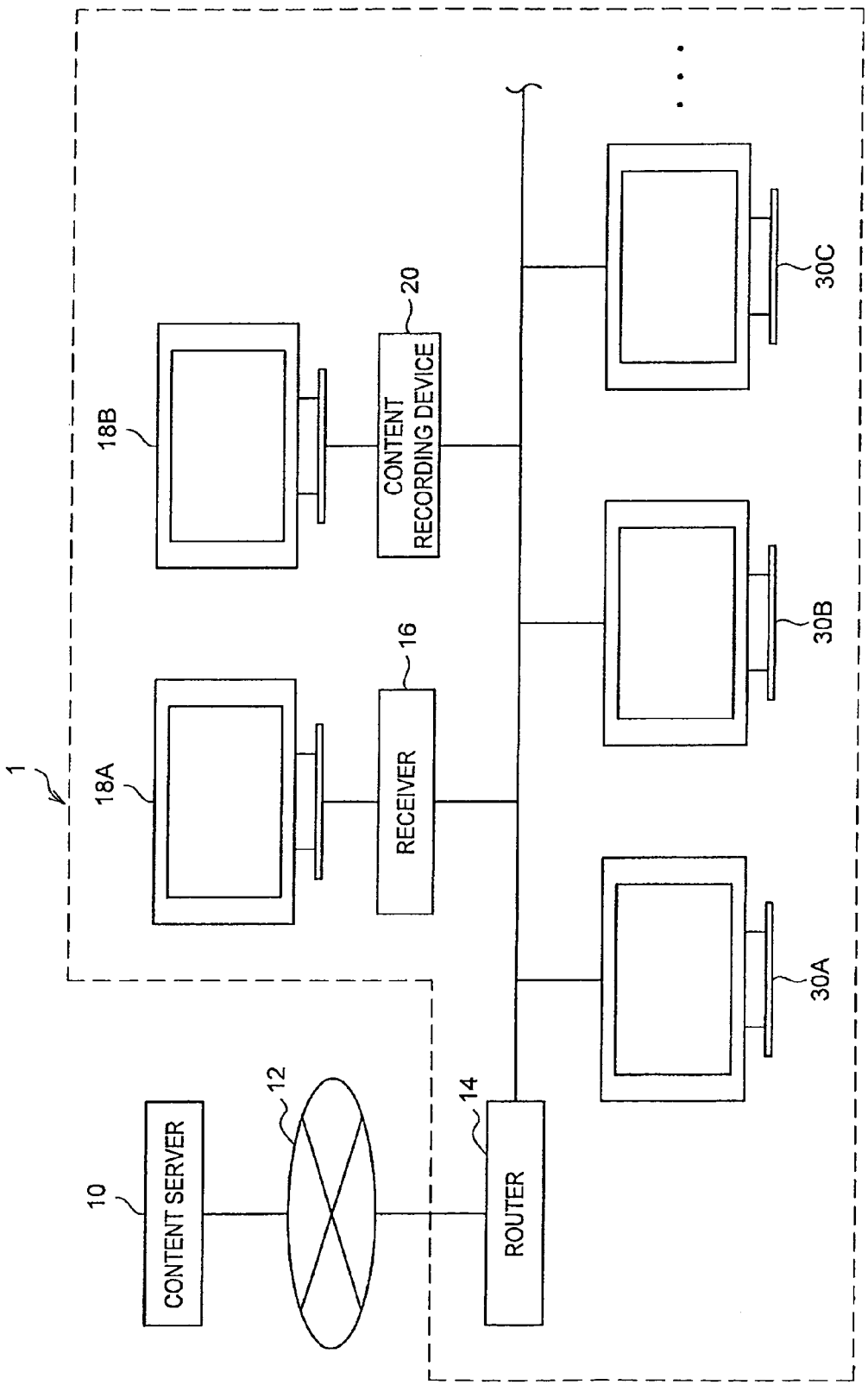
FIG. 1 is an explanatory diagram showing a configuration of a home network 1 according to a present embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The preferred embodiment of the present invention will be described in the order shown below.

Figure 2:
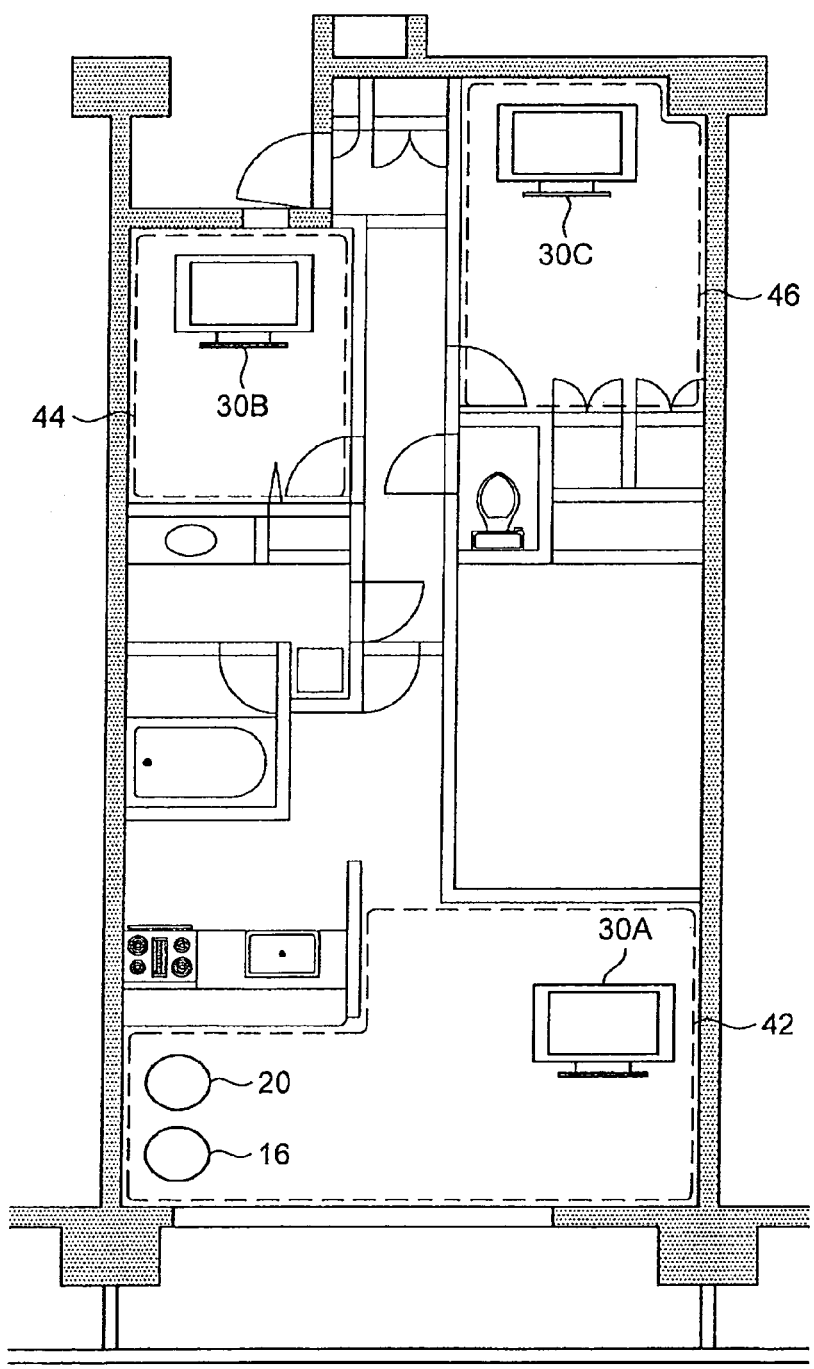
FIG. 2 is an explanatory diagram showing a concrete example of a layout of a house to which the home network is applied.

(1) Overview of a home network according to the present embodiment (2) Circumstance leading to the present embodiment (3) Function of a reproduction device configuring a home network (4) Function of a content recording device configuring a home network (5) Operation of the home network according to the present embodiment (6) Conclusion (1) Overview of a Home Network According to the Present Embodiment First, referring to FIGS. 1 and 2, a home network 1 according to the present embodiment will be schematically described.

FIG. 1 is an explanatory diagram showing a configuration of the home network 1 according to the present embodiment as an example of a content transmission system. As shown in FIG. 1, the home network 1 includes a router 14, a receiver 16, display devices 18A and 18B, a content recording device 20, and reproduction devices 30A to 30C. Note that, in FIG. 1, to distinguish each reproduction device, a capital letter is added to the reference numeral, such as reproduction devices 30A to 30C. However, when it is not necessary to particularly distinguish each reproduction device, they are simply collectively referred to as the reproduction device 30. Also for the display devices 18A and 18B, when it is not necessary to particularly distinguish between the display devices 18A and 18B, they are simply collectively referred to as the display device 18.

The router 14 is connected via a communication network 12 to a content server 10 which is storing content data and which is capable of delivering, transmitting or providing the content data. As the content data, there is audio data such as music, a lecture, a radio program, or the like, image data such as a motion picture, a television program, a video program, a photograph, a document, a painting, a diagram, or the like, or any other data such as a game, software, or the like.

Further, the communication network 12 is a wired or a wireless communication path for information that is transmitted from a device connected to the communication network 12. For example, the communication network 12 may include a public network such as the Internet, telephone network, satellite network, or the like, and a leased line network such as various local area networks (LANs) including Ethernet (registered trademark), a wide area network (WAN), an Internet protocol-virtual private network (IP-VPN), or the like.

The receiver 16 receives content data by an arbitrary method. For example, the receiver 16 requests the content server 10 via the router 14 for the transmission of a content list, and receives the content list transmitted from the content server 10 in response to the request. And the receiver 16 displays the received content list on the display device 18A, and requests the content server 10 via the router 14 for transmission of content data selected by a user. Then, the receiver 16 can receive the content data transmitted from the content server 10 in response to the request.

Further, the receiver 16 may receive content data by arbitrary broadcast such as a terrestrial wave digital broadcast, a cable TV broadcast, a broadcasting satellite (BS) digital broadcast, a communication satellite (CS) digital broadcast, or the like. The receiver 16 transmits the content data received in such manner to the content recording device 20. Note that each device configuring the home network may be connected in a wired manner or a wireless manner.

Further, in FIG. 1, although a case is shown where the receiver 16 and the content recording device 20 are configured separately, the receiver 16 and the content recording device 20 may be configured also as a single unit. Similarly, in FIG. 1, although a case is shown where the content recording device 20 and the reproduction device 30 are configured separately, the content recording device 20 and the reproduction device 30 may configured also as a single unit. Further, in FIG. 1, although a case is shown where the receiver 16 and the reproduction device 30 are configured separately, the receiver 16 and the reproduction device 30 may be configured also as a single unit.

The content recording device 20 has a function of a content transmission device storing in a storage section 250 embedded therein content data transmitted from the receiver 16. Further, the content recording device 20 can transmit to the reproduction device 30 the requested content data. However, with the content recording device 20 according to the present embodiment, by displaying a restriction standard setting screen on the display device 18B, a restriction standard is set by the user that is used at the time of determining the age restriction for each reproduction device 30. The content recording device 20 judges whether or not to transmit content data to each reproduction device 30 based on the age restriction (parental control) applied to each reproduction device 30. The details of such content recording device 20 will be described later in "(4) Function of a content recording device configuring a home network."

The reproduction device 30 has a function of a content reproduction device obtaining content data from the content recording device 20 and reproducing the same. In FIG. 1, a monitor is shown as an example of the reproduction device 30. However, the reproduction device 30 may be an information processing device such as a personal computer (PC), a home video processing device (a DVD recorder, a video cassette recorder, or the like), a mobile telephone, a Personal Handyphone System (PHS), a portable audio playback device, a portable video processing device, a personal digital assistants (PDA), a home game machine, a portable game machine, a home appliance, or the like. The details of the function of the reproduction device 30 will be described later in "(3) Function of a reproduction device configuring a home network."

Next, a concrete example of a house to which the home network 1 described above is applied is described with reference to FIG. 2.

FIG. 2 is an explanatory diagram showing a layout of a house to which the home network 1 is applied. As shown in FIG. 2, the house has a living room 42, a children's room 44, and a parents' bedroom 46.

The receiver 16, the content recording device 20, and the reproduction device 30A are placed in the living room 42. Also, the reproduction device 30B is placed in the children's room 44, and the reproduction device 30C is placed in the bedroom 46.

As shown in FIG. 2, even if each reproduction device 30 exists in a different room, with the home network 1, content data stored in the content recording device 20 can be shared and reproduced by each reproduction device 30.

(2) Circumstance Leading to the Present Embodiment

Heretofore, with reference to FIGS. 1 and 2, the home network 1 according to the present embodiment has been schematically described. Next, the circumstance that has led to the present embodiment will be described.

When violence or sexual portrayal is included in content data, age restriction is set so that the content data is kept from being viewed by, for example, children under 18. As the age restriction, there is R (Restricted) 15 restricting viewing by children under 15, R18 restricting viewing by children under 18, and the like. R15 takes the age of 15 as the upper limit of the age restriction, and R18 takes the age of 18 as the upper limit of the age restriction. Accordingly, by setting age restriction for a content reproduction device used by children and keeping content data on which age restriction is set from being transmitted to the content reproduction device on which age restriction is set, children can be protected from inappropriate content data.

However, a living room, for example, in a house is a place where a family gathers, and a content reproduction device placed in the living room may be used by both children and parents. If a fixed age restriction is set for such content reproduction device that may be used by non-specified users, it becomes hard to appropriately control the restriction of viewing of content data.

For example, when R18 is constantly set on the content reproduction device placed in the living room, children can be prevented from viewing R20 content data, but parents who can by right view R20 content data are also prevented from viewing R20 content data. Further, if age restriction is not set for the content reproduction device placed in the living room, although parents are not unjustly prevented from viewing content data, children cannot be protected from content data on which age restriction is set.

Thus, by focusing on the circumstance as described above, the content recording device 20 according to the present embodiment has been achieved. According to the content recording device 20 according to the present embodiment, age restriction allowing or restricting viewing can be flexibly changed for each reproduction device 30. Hereunder, after describing the function of the reproduction device 30 with reference to FIGS. 3 and 4, the function of the content recording device 20 will be described in detail with reference to FIGS. 5 to 10.

(3) Function of a Reproduction Device Configuring a Home Network

Figure 3:
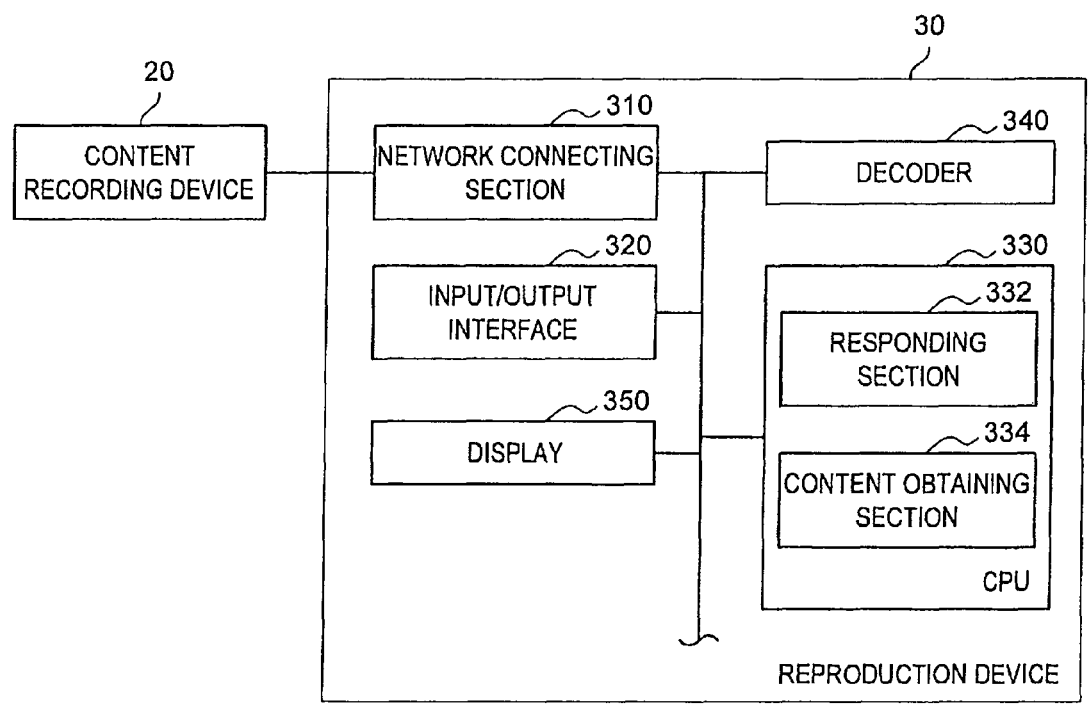
FIG. 3 is a function block diagram showing a configuration of a reproduction device according to the present embodiment.

FIG. 3 is a function block diagram showing a configuration of the reproduction device 30 according to the present embodiment. As shown in FIG. 3, the reproduction device 30 includes a network connecting section 310, an input/output interface 320, a central processing unit (CPU) 330, a decoder 340, and a display 350.

The network connecting section 310 is a wired or a wireless interface to other devices included in the home network 1, and functions as a receiving section receiving various data from the other devices and a transmitting section transmitting various data to the other devices. For example, the network connecting section 310 may have the wireless communication function specified by IEEE (Institute of Electrical and Electronic Engineers) 802.11a, b, g and the like, or the MIMO (Multiple Input Multiple Output) communication function specified by IEEE 802.11n. Further, the network connecting section 310 may have a communication function compatible with the wired LAN specified by IEEE 802.3.

The input/output interface 320 is an interface to the user of the reproduction device 30. The input/output interface 320 is configured by operation means including a touch panel, a button, a switch, a lever, a dial, and a light-receiving section for infrared signals or a receiving section receiving radio signals generated by a remote controller, an input control circuit creating an operation signal in response to the operation on the operation means by the user and outputting the same to the CPU 330, and the like. The user of the reproduction device 30 can, by operating the input/output interface 320, input various data to the reproduction device 30 or issue instruction for various processes. As the various processes, there are, for example, selection of content data from a content list, reproducing/pausing/fast forwarding/rewinding/volume controlling of content data, and the like.

The CPU 330 is implemented with functions of, for example, a responding section 332, a content obtaining section 334, and the like, and controls the overall operation of the reproduction device 30. Although the drawing of such CPU 330 is omitted in FIG. 3, it may operate based on a program stored in a read only memory (ROM) with a random access memory (RAM) as the work area.

The responding section 332 responds to various requests from the devices in the home network 1. For example, when the content recording device 20 transmits a response request to grasp the reproduction device 30 existing in the home network 1, the responding section 332 responds via the network connecting section 310 to show that the device to which it belongs exists in the home network 1.

The content obtaining section 334 performs a series of processes for obtaining content data from the content recording device 20. For example, the content obtaining section 334 requests the content recording device 20 for transmission of a content list showing a list of content data that can be obtained at the time. And when the content list transmitted from the content recording device 20 is received, the content obtaining section 334 requests the content recording device 20 for transmission of content data selected from the content list by the user via the input/output interface 320. Then, the reproduction device 30 can obtain the content data transmitted from the content recording device 20 in response to the request from the content obtaining section 334.

The decoder 340 decodes the content data transmitted from the content recording device 20. And the display 350 displays the content data decoded by the decoder 340. As formats of content data to be decoded by the decoder 340, there are, for example, an image compression format such as Joint Photographic coding Experts Group (JPEG), Moving Picture Experts Group (MPEG) 1, MPEG 2, MPEG 4, or the like, an audio compression format such as MPEG1 Audio Layer-3 (MP3), Advanced Audio Coding (AAC), Linear PCM (LPCM), Windows (registered trademark) Media Audio 9 (WMA9), Adaptive Transform Acoustic Coding (ATRAC), ATRAC3, or the like. Further, as shown in FIG. 4, the display 350 also displays a content list screen 50 showing the above-described content list.

Figure 4:
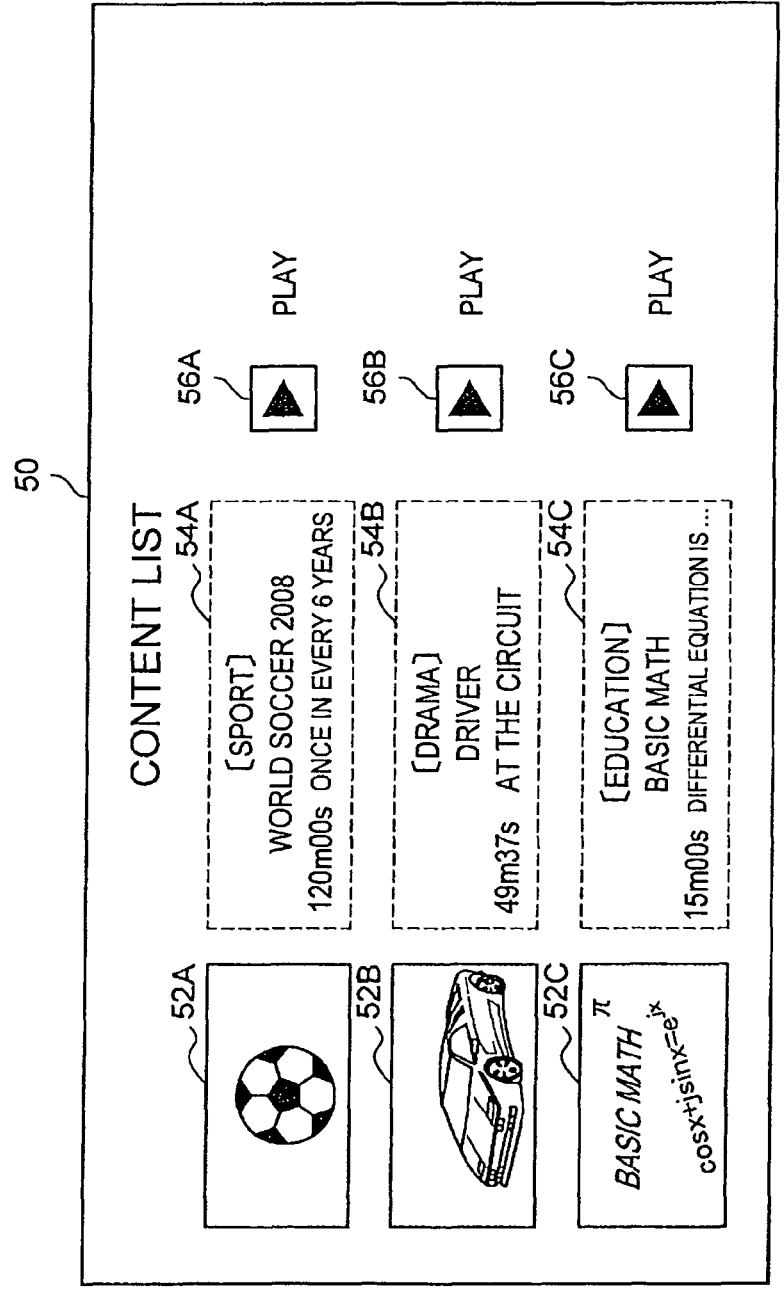
FIG. 4 is an explanatory diagram showing a concrete example of a content list screen to be displayed on a display.

FIG. 4 is an explanatory diagram showing a concrete example of the content list screen 50 to be displayed on the display 350. As shown in FIG. 4, the content list screen 50 includes thumbnails 52A to 52C corresponding to each content data, brief information 54A to 54C, and Play buttons 56A to 56C.

The user of the reproduction device 30 can select, for example, the Play button 56A for content data whose title is "World Soccer 2008" via the input/output interface 320 on the content list screen 50 shown in FIG. 4. When the Play button 56A is selected by the user of the reproduction device 30, the content obtaining section 334 requests the content recording device 20 for transmission of the content data whose title is "World Soccer 2008." Then, the decoder 340 decodes the content data whose title is "World Soccer 2008" transmitted from the content recording device 20, and the display 350 displays the content data decoded by the decoder 340. Note that the display 350 may include the function of an audio output section such as a speaker, earphones or the like outputting audio.

(4) Function of a Content Recording Device Configuring a Home Network

Heretofore, the function of the reproduction device 30 according to the present embodiment has been described with reference to FIGS. 3 and 4. Next, with reference to FIGS. 5 to 10, a function of the content recording device 20 according to the present embodiment will be described.

Figure 5:
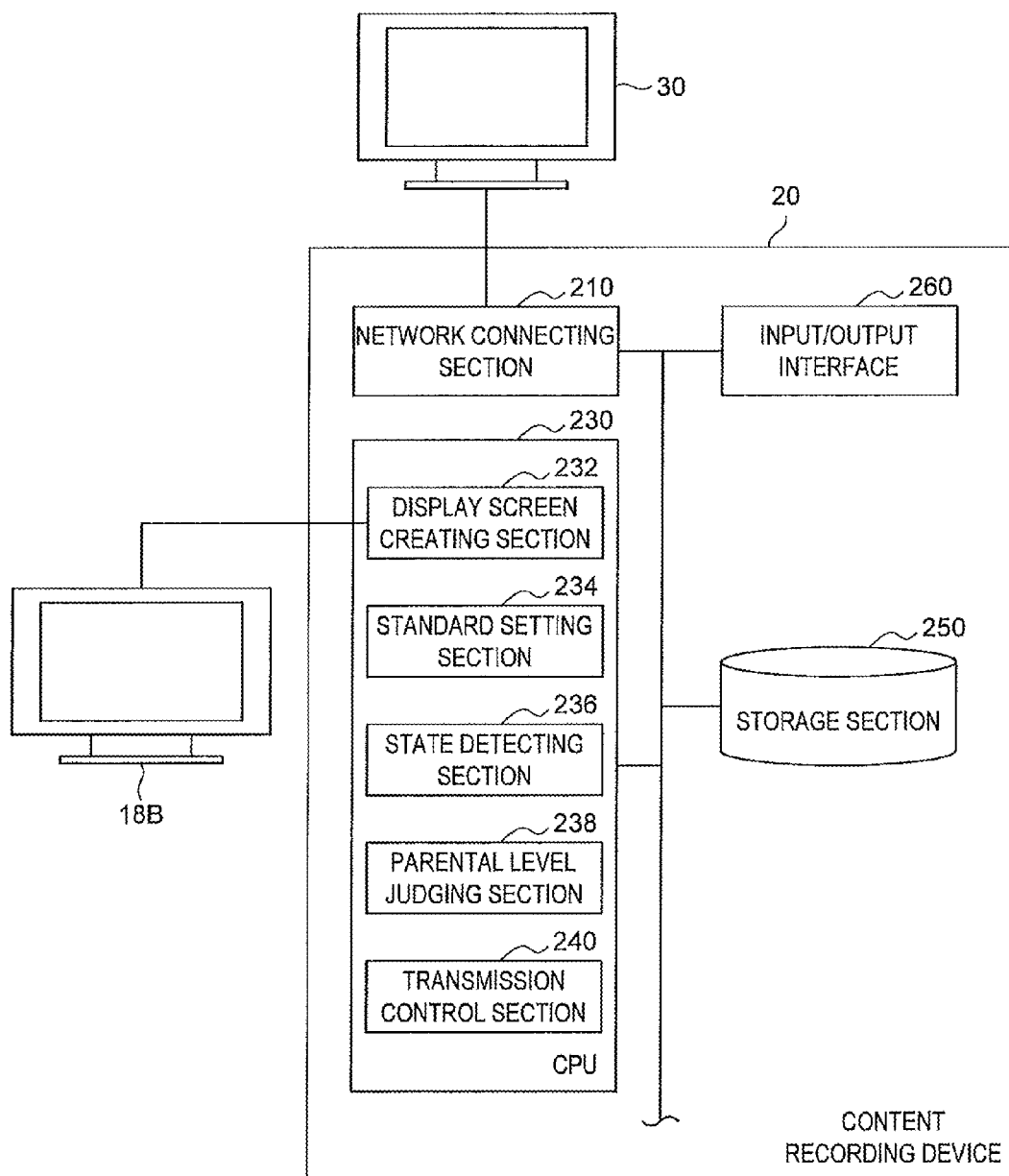
FIG. 5 is a function block diagram showing a configuration of a content recording device according to the present embodiment.

FIG. 5 is a function block diagram showing a configuration of the content recording device 20 according to the present embodiment. As shown in FIG. 5, the content recording device 20 includes a network connecting section 210, a CPU 230, a storage section 250, and an input/output interface 260.

The network connecting section 210 is a wired or a wireless interface to other devices included in the home network 1, and functions as a receiving section receiving various data from the other devices and a transmitting section transmitting various data to the other devices. For example, the network connecting section 210 receives content data from the receiver 16 or transmits content data to the reproduction device 30. Further, as with the network connecting section 310 of the reproduction device 30, the network connecting section 210 may have the wireless communication function specified by IEEE 802.11a, b, g and the like, or the MIMO communication function specified by IEEE 802.11n. Further, the network connecting section 210 may have a communication function compatible with the wired LAN specified by IEEE 802.3.

The CPU 230 is implemented with functions of, for example, a display screen creating section 232, a standard setting section 234, a state detecting section 236, a parental level judging section 238, and a transmission control section 240, and controls the overall operation of the content recording device 20. Although its drawing is omitted in FIG. 5, the CPU 230 may operate based on a program stored in a ROM with a RAM as the work area.

The storage section 250 is a storage medium on which content data received from the receiver 16 by the network connecting section 210 is stored. Further, information relating to restriction standard described later is also stored on the storage section 250.

Such storage section 250 may be a storage medium such as a non-volatile memory such as an electrically erasable programmable read-only memory (EEPROM), an erasable programmable read-only memory (EPROM) or the like, a magnetic disk such as a hard disk, a circular magnetic disk or the like, an optical disk such as a compact disc recordable (CD-R), a compact disc rewritable (CD-RW), a digital versatile disc recordable (DVD-R), a digital versatile disc rewritable (DVD-RW), a dual-layer digital versatile disc recordable (DVD+R), a dual-layer digital versatile disc rewritable (DVD+RW), a digital versatile disc random access memory (DVD-RAM), a Blu-ray (registered trademark) disc recordable (BD-R), a Blu-ray™ disc recordable (BD-RE) or the like, or a magneto-optical (MO) disk, or the like. Note that the storage section 250 may function as a buffer for temporarily holding content data transmitted from the receiver 16 to transfer the same to the reproduction device 30.

The input/output interface 260 is an interface to the user of the content recording device 20, and has a function of an input section. The input/output interface 260 is configured by operation means including a touch panel, a button, a switch, a lever, a dial, and a light-receiving section for infrared signals or a receiving section receiving radio signals generated by a remote controller, an input control circuit creating an operation signal in response to the operation on the operation means by the user and outputting the same to the CPU 230, and the like. The user of the content recording device 20 can, by operating the input/output interface 260, input various data to the content recording device 20 or issue instruction for various processes. As the various processes, there is, for example, a setting process of restriction standard.

Next, the function implemented on the CPU 230 will be described in detail.

Figure 7:
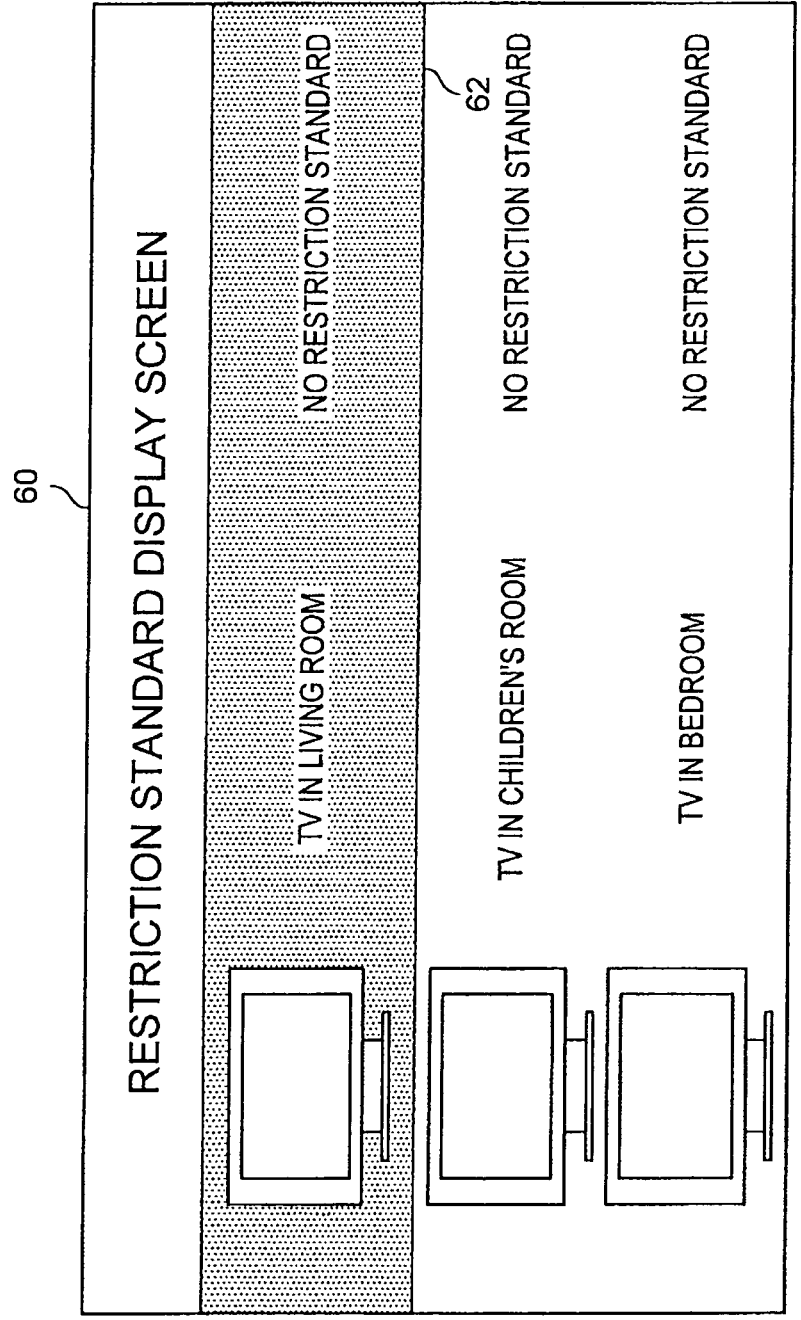
FIG. 7 is an explanatory diagram showing a concrete example of a restriction standard display screen created by a display screen creating section.
Figure 8:
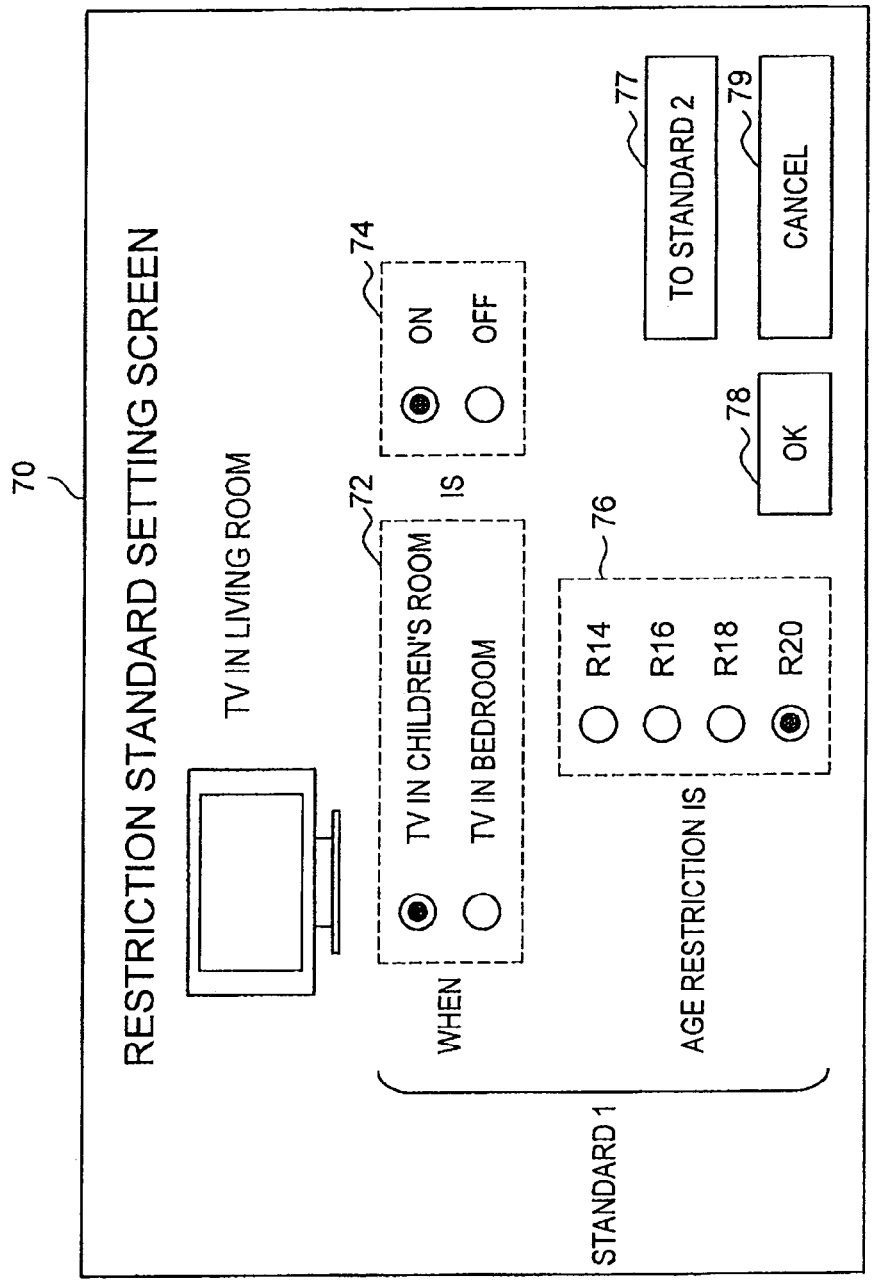
FIG. 8 is an explanatory diagram showing a concrete example of a restriction standard setting screen created by the display screen creating section.
Figure 9:
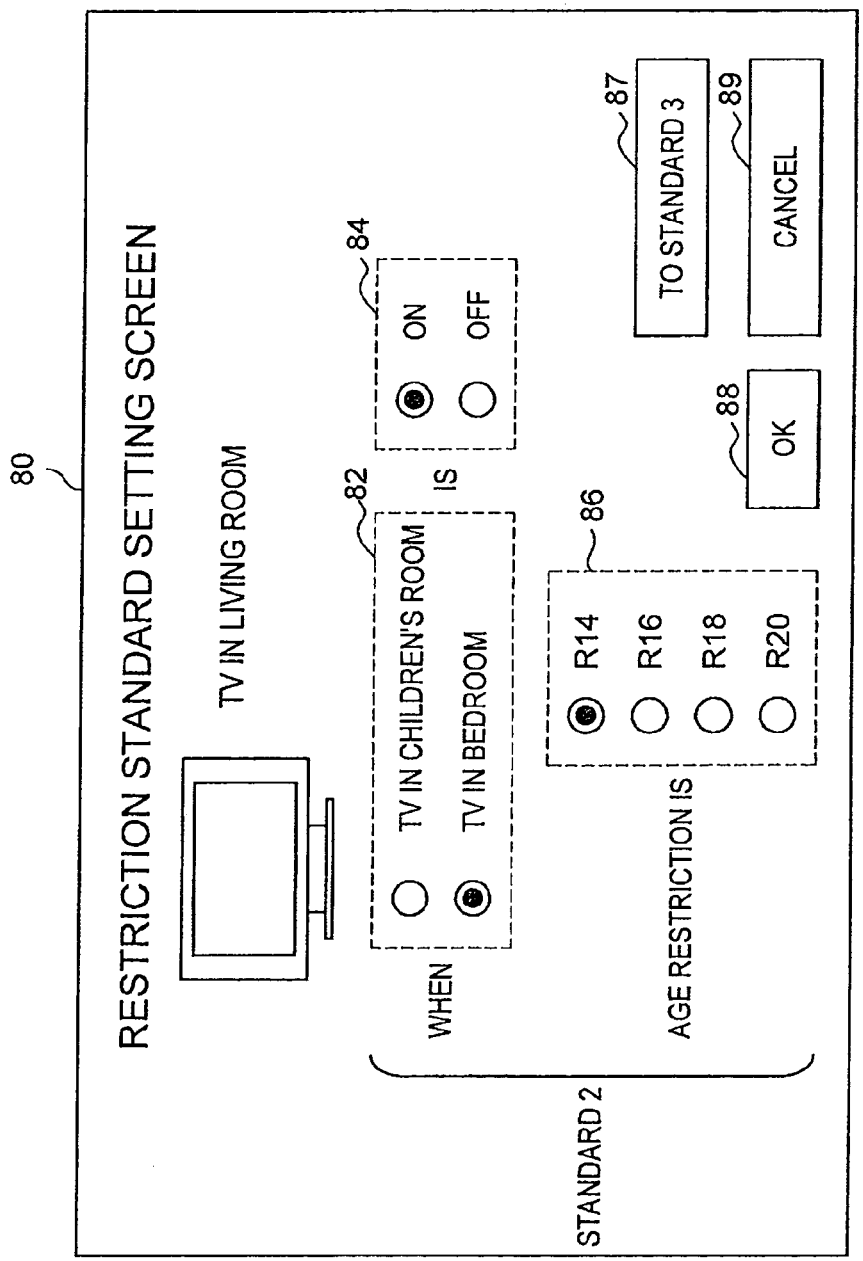
FIG. 9 is an explanatory diagram showing a concrete example of a restriction standard setting screen further created by the display screen creating section.

The display screen creating section 232 creates, in response to the operation on the input/output interface 260 by the user, a restriction standard display screen 60 shown in FIG. 7, restriction standard setting screens 70 and 80 shown in FIGS. 8 and 9, and the like.

When a set request for a restriction standard (determination standard) is input to the input/output interface 260 by the user, the standard setting section 234 performs a process for setting a restriction standard to determine the age restriction to be applied to each reproduction device 30. To be more precise, first, the standard setting section 234 obtains device information of each reproduction device 30 shown in FIG. 6.

FIG. 6 is an explanatory diagram showing a concrete example of a device list including the device information of each reproduction device 30 obtained by the standard setting section 234. As shown in FIG. 6, the device information includes a device name, a device ID, an IP address and a restriction standard. Further, in the specification, for the sake of convenience of description, description will be made assuming that a device ID and a reference numeral correspond to each other. For example, the device ID of the reproduction device 30A is assumed to be 30A.

Accordingly, FIG. 6 shows that the device name of the reproduction device 30A is "TV in living room", the device ID is "30A", the IP address is "192.xxx.aaa . . . ", and that the restriction standard is not set. Similarly, in FIG. 6, the device information of the reproduction devices 30B and 30C are shown.

When the device information of each reproduction devices 30 is obtained by the standard setting section 234, the display screen creating section 232 creates the restriction standard display screen 60 shown in FIG. 7, for example, and displays the restriction standard display screen 60 on the display device 18B.

FIG. 7 is an explanatory diagram showing a concrete example of the restriction standard display screen 60 created by the display screen creating section 232. As shown in FIG. 7, the restriction standard display screen 60 includes the device name and restriction standard set state for each reproduction device 30. In the example shown in FIG. 7, since restriction standard is not set for each reproduction device 30 at the time, "no restriction standard" is described for each reproduction device 30.

When the user points, via the input/output interface 260, a cursor 62 to the reproduction device 30A (TV in living room) on such restriction standard display screen 60 and the reproduction device 30A is selected, the display screen creating section 232 creates the restriction standard setting screen 70 shown in FIG. 8.

Note that, before creating the restriction standard setting screen 70, the display screen creating section 232 may create a password input screen to check whether the user of the content recording device 20 has the right or not. As such, by making it possible to set or change restriction standard after performing password authentication, it becomes possible to restrict the user who can set the restriction standard applied to the reproduction device 30. Accordingly, it becomes possible to suppress a case of the restriction standard applied to the reproduction device 30 being unjustly set.

Further, the checking of whether the user has the right or not is not limited to be performed by the password authentication, and can be performed by an arbitrary method. For example, the authentication process may be a fingerprint authentication method requiring the user to input a fingerprint, and performing authentication based on whether or not the input fingerprint matches or is similar to the fingerprint stored in the storage section 250. Further, the authentication process may be a medium authentication method requiring the user to move an IC card closer, and performing authentication based on whether or not the IC card that is brought closer matches the IC card information stored in the storage section 250. In addition, the authentication process may be a voice authentication method using the voice of the user, a retina authentication method based on the pattern of the retina of the user, a face authentication method based on the shape of the face of the user, or the like.

FIG. 8 is an explanatory diagram showing a concrete example of the restriction standard setting screen 70 created by the display screen creating section 232. As shown in FIG. 8, the restriction standard setting screen 70 includes a target device selection display 72, a target device state selection display 74, an age restriction selection display 76, a button 77 for proceeding to Standard 2, an OK button 78, and a Cancel button 79.

The user can select on the target device selection display 72 a device that affects the age restriction for the reproduction device 30A (TV in living room). Further, the user can select on the target device state selection display 74 the ON-OFF state of the selected device. Here, as the ON-OFF state, a state where power is supplied or a state where power is shut off is assumed. Further, the user can select on the age restriction selection display 76 the age restriction to be applied to the reproduction device 30A when the ON-OFF state is selected for the device selected by the user.

In the example shown in FIG. 8, the reproduction device 30B (TV in children's room) is selected as the target device, ON is selected as the state of the target device, and R20 is selected as the age restriction. When the OK button 78 is selected on the restriction standard setting screen 70, the standard setting section 234 sets as the restriction standard for the reproduction device 30A the selected target device, the state of the target device and the age restriction. Then, if the power of the reproduction device 30B is ON, R20 is applied as the age restriction for the reproduction device 30A.

The above-described age restriction is a boundary between the age restriction on content data the viewing of which is allowed and the age restriction on content data the viewing of which is restricted on the reproduction device 30A. Accordingly, content data on which age restriction is set that is the same as or lower than the age restriction set for the reproduction device 30A may be allowed to be viewed on the reproduction device 30A, and content data on which age restriction is set that is higher than the age restriction set for the reproduction device 30A may be restricted from being viewed on the reproduction device 30A. For example, when R14 is set for age restriction, content data on which age restriction is set that is R14 or lower, such as PG12 or R14, may be allowed to be viewed on the reproduction device 30A, and content data on which age restriction is set that is higher than R14, such as R16 or R18, may be restricted from being viewed on the reproduction device 30A.

Further, content data on which age restriction (rating) is set that is lower than the age restriction set for the reproduction device 30A may be allowed to be viewed on the reproduction device 30A, and content data on which age restriction is set that is the same as or higher than the age restriction set for the reproduction device 30A may be restricted from being viewed on the reproduction device 30A. For example, when R14 is set for age restriction, content data on which age restriction is set that is lower than R14, such as PG12, may be allowed to be viewed on the reproduction device 30A, and content data on which age restriction is set that is R14 or higher, such as R14 or R18, may be restricted from being viewed on the reproduction device 30A. Note that the above-described age restriction is applied in a case where a target device is specified.

On the other hand, when the Cancel button 79 is selected on the restriction standard setting screen 70, the display screen creating section 232 creates the restriction standard display screen 60 shown in FIG. 7 and displays the same on the display device 18B.

Further, when the button 77 for proceeding to Standard 2 is selected on the restriction standard setting screen 70, the display screen creating section 232 creates the restriction standard setting screen 80 shown in FIG. 9.

FIG. 9 is an explanatory diagram showing a concrete example of the restriction standard setting screen 80 further created by the display screen creating section 232. The restriction standard setting screen 80 is a display screen for adding restriction standard to be applied to the reproduction device 30A. Such restriction standard setting screen 80 is configured to be almost identical to the restriction standard setting screen 70, and includes a target device selection display 82, a target device state selection display 84, an age restriction selection display 86, a button 87 for proceeding to Standard 3, an OK button 88, and a Cancel button 89.

In the example shown in FIG. 9, the reproduction device 30C (TV in bedroom) is selected as the target device, and ON is selected as the state of the target device and R14 is selected as the age restriction. And when the OK button 88 is selected on the restriction standard setting screen 80, the standard setting section 234 additionally sets the selected target device, the state of the target device and the age restriction as the restriction standard for the reproduction device 30A. Then, when the power of the reproduction device 30C is ON, R14 is applied to the reproduction device 30A as the age restriction.

On the other hand, when the Cancel button 89 is selected on the restriction standard setting screen 80, the display screen creating section 232 may create the restriction standard display screen 60 shown in FIG. 7 and display the same on the display device 18B.

Further, when the button 77 for proceeding to Standard 2 is selected on the restriction standard setting screen 70, the display screen creating section 232 may create a screen for setting a third restriction standard that is substantially identical with the restriction standard setting screen 70 and the restriction standard setting screen 80.

When the setting by the user via such display screen is completed, the device list of each reproduction device 30 is updated to that shown in FIG. 10, for example.

FIG. 10 is an explanatory diagram showing a concrete example of the device list after the setting of restriction standard. As shown in FIG. 10, compared to the example shown in FIG. 6, restriction standard is added to the device information of the reproduction device 30A (TV in living room). Such device list is stored in the storage section 250, and is used when there is a request from the reproduction device 30 for obtaining content data. Note that such device information including age restriction and valid time may be transmitted to each reproduction device 30 and be held by each reproduction device 30.

Here, returning to the description of the configuration of the content recording device 20 with reference to FIG. 5, the state detecting section 236 has a function of a detecting section detecting the state of each device included in the home network 1. For example, the state detecting section 236 detects whether the power of the reproduction devices 30A, 30B and 30C is ON or OFF. To be more precise, the state detecting section 236 may periodically broadcast a request for a state report to each reproduction device 30 included in the home network 1, and obtain the ON-OFF state of power transmitted from each reproduction device 30 in response to the request. Or, each reproduction device 30 may periodically transmit the ON-OFF state of power to the content recording device 20. Further, the state detecting section 236 may broadcast a request for a state report to each reproduction device 30 included in the home network 1 when the necessity arises, and obtain the ON-OFF state of power transmitted from each reproduction device 30 in response to the request.

Further, the state of each reproduction device 30 to be detected by the state detecting section 236 is not limited to the ON-OFF state of power. In recent years, a brightness sensor (optical sensor) is provided to the reproduction device 30 to adjust the brightness of the display 350 according to the surrounding brightness. Accordingly, the state detecting section 236 may detect the sensed state of light by such brightness sensor. And the sensed state of light may be added to the condition relating to the state of a device for the restriction standard. Note that the brightness sensor may be independently provided to the home network 1, and the state detecting section 236 may detect the sensed state of light by the brightness sensor independently provided.

Further, a sensor capable of sensing the presence of man can be provided to the home network 1 indirectly, and the state detecting section 236 may detect the state sensed by the sensor. As the sensor capable of sensing the presence of man, there is an arbitrary sensor, such as an infrared sensor, a temperature sensor, a humidity sensor, a gyroscope, a wind sensor, or the like.

When requested from the reproduction device 30 for transmission of a content list, the parental level judging section (parental level determining section) 238 determines the age restriction to be applied to the reproduction device 30 at the time according to the restriction standard for the reproduction device 30 stored in the storage section 250 and the detection state by the state detecting section 236. For example, when the reproduction device 30B (TV in children's room) is ON, the parental level judging section 238 determines the age restriction for the reproduction device 30A to be R20. That is, in a case where the age restriction for the reproduction device 30A is normally set to R18, when the reproduction device 30B (TV in children's room) is ON, the parental level judging section 238 raises to R20 the standard for the age restriction on content data the viewing of which is allowed on the reproduction device 30A.

On the other hand, when the reproduction device 30C (TV in bedroom) is ON, the parental level judging section 238 determines the age restriction for the reproduction device 30A to be R14. That is, in a case where the age restriction for the reproduction device 30A is normally set to R18, when the reproduction device 30C (TV in bedroom) is ON, the parental level judging section 238 tightens the standard for the age restriction on content data the viewing of which is allowed on the reproduction device 30A. Note that, even in a case where age restriction is not set for the reproduction device 30A, setting of age restriction as such corresponds to tightening of the standard for the age restriction on content data the viewing of which is allowed on the reproduction device 30A.

Further, the parental level judging section 238 may further determine the age restriction to be applied to the reproduction device 30A according to a current time. With such a configuration, if the user of the reproduction device 30A differs depending on the time, it becomes possible to apply to each user an age restriction appropriate to the user. For example, if it is known that children go to bed at 11 PM, the parental level judging section 238 may release the age restriction for all the reproduction devices 30 after 11 PM. Further, such a lifestyle habit of children can be obtained based on the state of each device detected by the state detecting section 236 in the past. For example, if it is detected by the state detecting section 236 that light of children's room is turned off at around 11 PM everyday, the lifestyle habit of children going to bed at 11 PM is obtained.

The transmission control section (control section) 240 transmits from the network connecting section 210 to the reproduction device 30 content list not including the item indicating the content data on which age restriction is set that is higher than the age restriction determined by the parental level judging section 238.

Further, when requested by the reproduction device 30 for transmission of certain content data included in the content list, the transmission control section 240 transmits the requested content data from the network connecting section 210 to the reproduction device 30.

As described above, the content recording device 20 according to the present embodiment can determine the age restriction applied to the reproduction device 30 according to the state of another device. Accordingly, even if the user of the reproduction device 30 is not specified, viewing of content data can be appropriately restricted for each user.

For example, when the users of the reproduction device 30C are specified to be parents and the power of the reproduction device 30C is ON, it is highly probable that the user of the reproduction device 30A at the time is a child. In this case, as described above, with the parental level judging section 238 lowering the upper limit of parental level on content data the viewing of which is allowed on the reproduction device 30A, children can be effectively protected from inappropriate content data.

Further, when the users of the reproduction device 30B are specified to be children and the power of the reproduction device 30B is ON, it is highly probable that the user of the reproduction device 30A at the time is a parent. In this case, as described above, with the parental level judging section 238 raising the upper limit of parental level on content data the viewing of which is allowed on the reproduction device 30A, it can be prevented that the parent is overly restricted from viewing content data.

(5) Operation of the Home Network According to the Present Embodiment

Next, an operation of the home network 1 according to the present embodiment will be described with reference to FIGS. 11 to 14.

Figure 11:
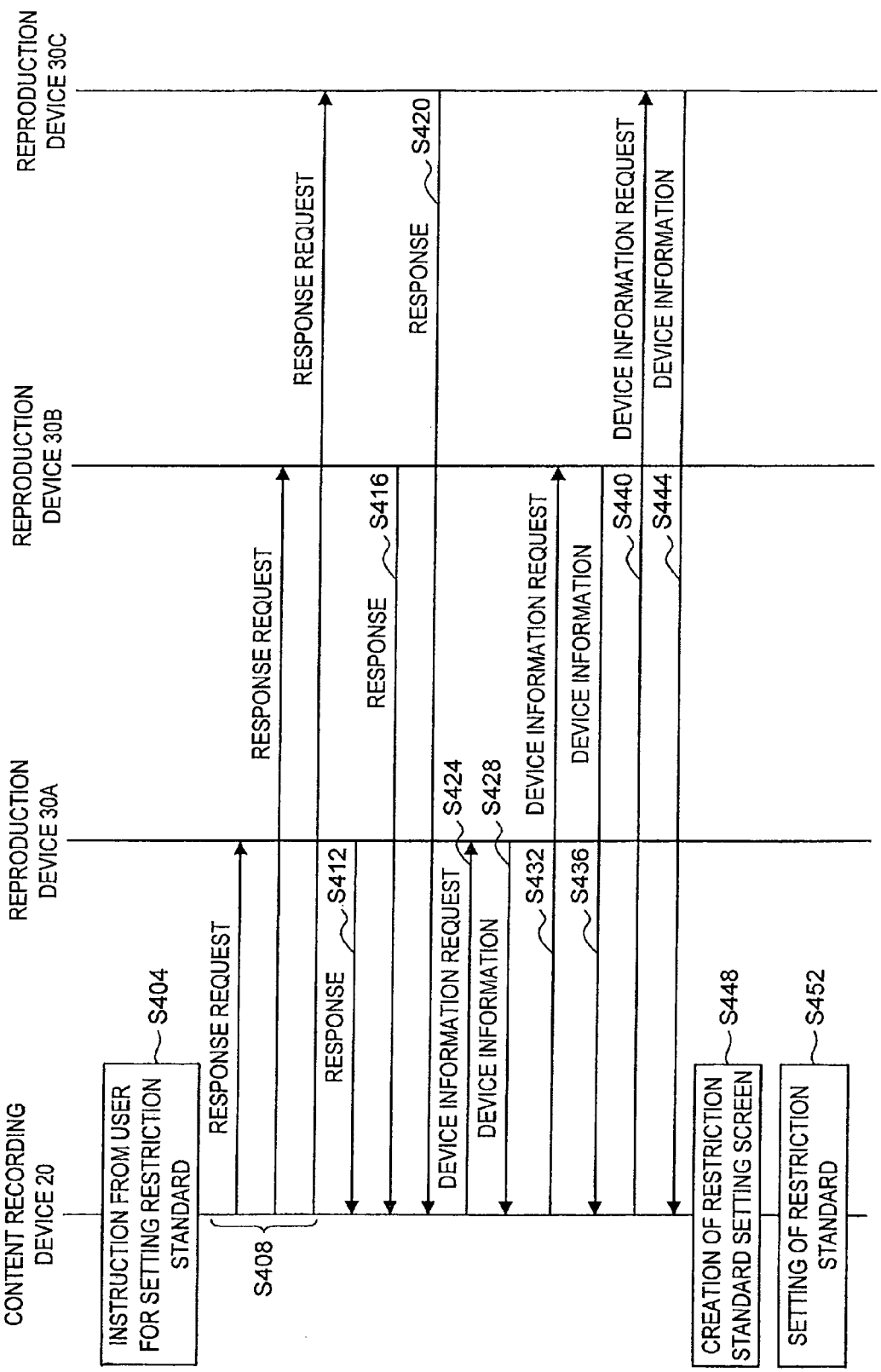
FIG. 11 is a sequence diagram showing a flow of setting restriction standard.

FIG. 11 is a sequence diagram showing a flow of setting restriction standard. As shown in FIG. 11, first, when an instruction for setting restriction standard is input to the content recording device 20 by the user (S404), the content recording device 20 broadcasts a response request to the reproduction devices 30 existing in the home network 1 (S408).

When receiving the response request from the content recording device 20, the reproduction device 30A existing in the home network 1 transmits to the content recording device 20 a response including the IP address of the reproduction device 30A (S412). Further, when receiving the response request from the content recording device 20, the reproduction device 30B existing in the home network 1 transmits to the content recording device 20 a response including the IP address of the reproduction device 30B (S416). Similarly, when receiving the response request from the content recording device 20, the reproduction device 30C existing in the home network 1 transmits to the content recording device 20 a response including the IP address of the reproduction device 30C (S420). Note that, in the above, although an example is described where the content recording device 20 searches for the reproduction device 30, the present invention is not limited to such an example. For example, the reproduction device 30 may search for the content recording device 20 at the time of start-up, and the content recording device 20 may transmit the response.

Next, the content recording device 20 requests the reproduction device 30A, based on the IP address included in the response, for transmission of the device information of the reproduction device 30A (S424). When requested for transmission of the device information, the reproduction device 30A transmits to the content recording device 20 the device information including the function, the device name and the like of the reproduction device 30A (S428). Similarly, the content recording device 20 requests the reproduction device 30B, based on the IP address included in the response, for transmission of the device information of the reproduction device 30B (S432). When requested for transmission of the device information, the reproduction device 30B transmits to the content recording device 20 the device information including the function, the device name and the like of the reproduction device 30B (S436). Further, the content recording device 20 requests the reproduction device 30C, based on the IP address included in the response, for transmission of the device information of the reproduction device 30C (S440). When requested for transmission of the device information, the reproduction device 30C transmits to the content recording device 20 the device information including the function, the device name and the like of the reproduction device 30C (S444).

Then, the display screen creating section 232 of the content recording device 20 creates the restriction standard setting screen 70 shown in FIG. 8 based on the device information received from each reproduction device 30 or the device information stored in the storage section 250 (S448). Then, the standard setting section 234 sets as parental level for each reproduction device 30 the target device, the state of the target device, and the age restriction selected on the restriction standard setting screen 70 (S452).

Figure 12:
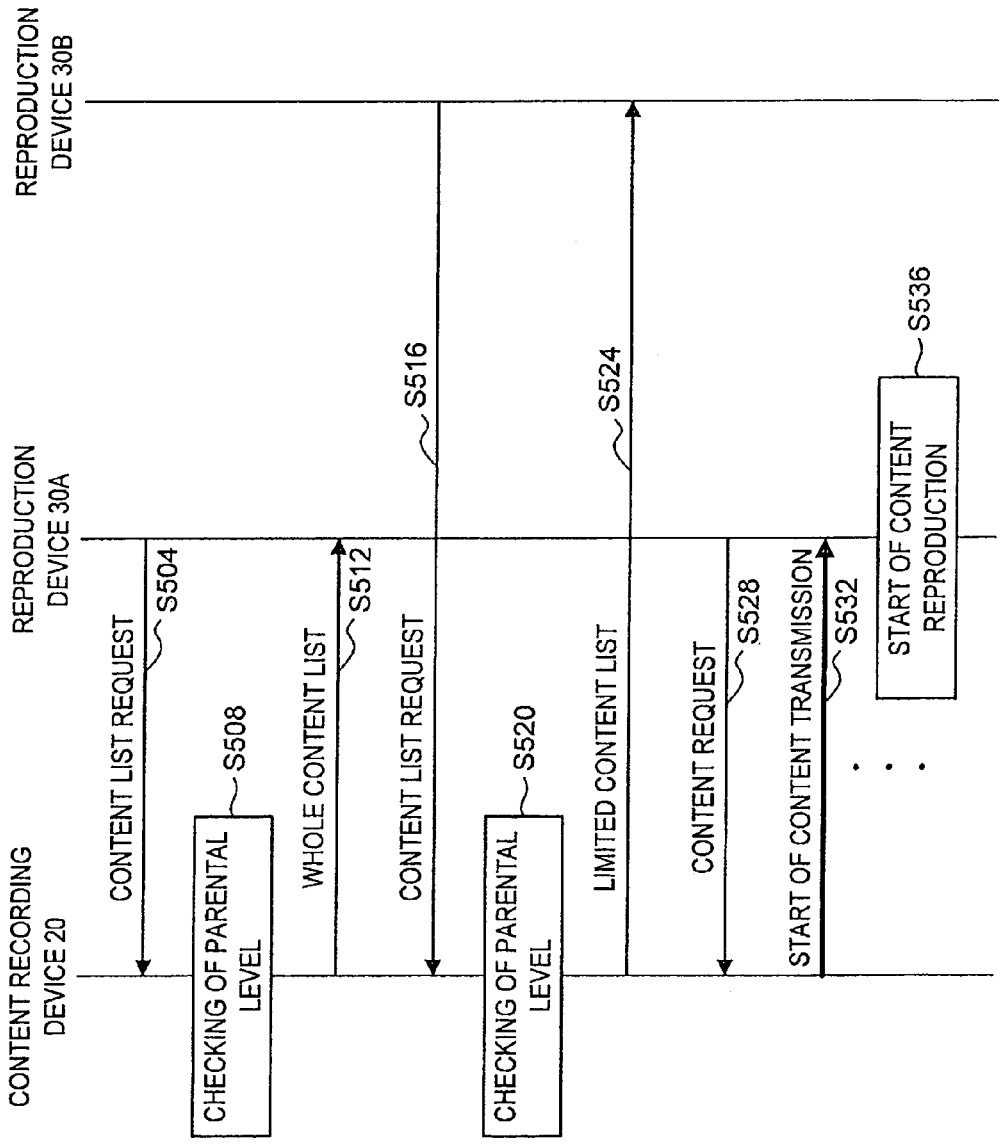
FIG. 12 is a sequence diagram showing a flow until content data is reproduced by a reproduction device.

FIG. 12 is a sequence diagram showing a flow until content data is reproduced by the reproduction device 30. As shown in FIG. 12, first, when the reproduction device 30C requests the content recording device 20 for a content list (S504), the parental level judging section 238 of the content recording device 20 checks the age restriction for the reproduction device 30C (S508). Then, when it is checked by the parental level judging section 238 that no age restriction is applied to the reproduction device 30C, the transmission control section 240 transmits from the network connecting section 210 to the reproduction device 30C a content list indicating all the content data (S512).

Further, when the reproduction device 30A requests the content recording device 20 for a content list (S516), the parental level judging section 238 of the content recording device 20 checks the parental level for the reproduction device 30A (S520). Here, since the power of the reproduction device 30C is ON, the parental level judging section 238 determines the age restriction to be applied to the reproduction device 30A to be R14. Accordingly, the transmission control section 240 transmits from the network connecting section 210 to the reproduction device 30A a limited content list indicating content data the viewing of which is allowed on the reproduction device 30A (S524).

Then, when requested by the reproduction device 30C for content data included in the content list transmitted in S512 (S528), the transmission control section 240 of the content recording device 20 starts transmitting the content data (S532). And the reproduction device 30C starts reproducing the content data being transmitted from the content recording device 20 (S536).

Figure 13:
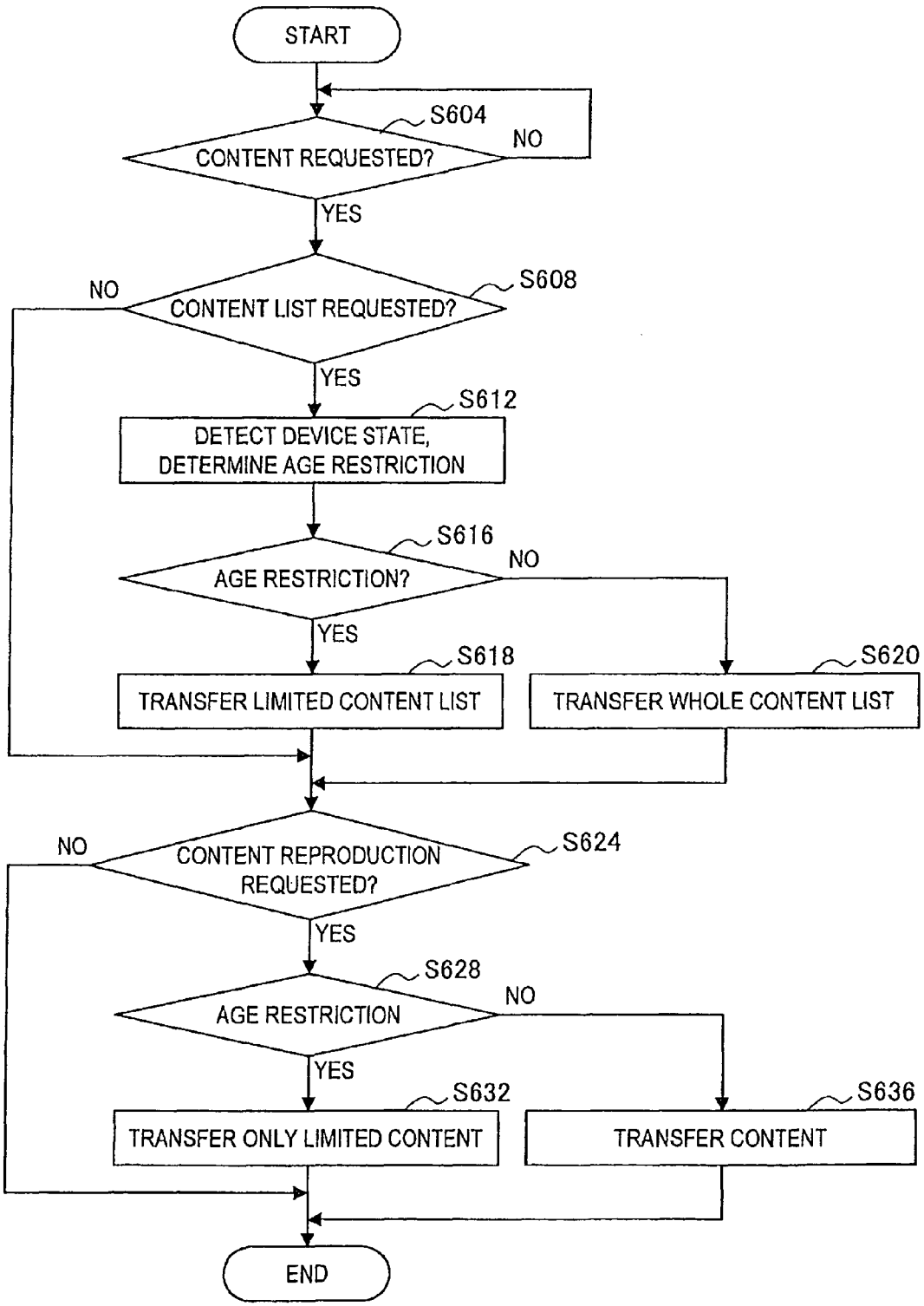
FIG. 13 is a flow chart showing a flow of a parental level determining method executed by the content recording device.

FIG. 13 is a flow chart showing a flow of a parental level determining method executed by the content recording device 20. As shown in FIG. 13, when content is requested by the reproduction device 30 (S604), and a content list is requested by the reproduction device 30 (S608), the parental level judging section 238 of the content recording device 20 refers to a device list (S612). Then, the age restriction to be applied to the reproduction device 30 is determined by the parental level judging section 238 based on the detection state of the state detecting section 236 and the restriction standard (S612).

When a certain age restriction is determined by the parental level judging section 238 (S616), the transmission control section 240 transmits a limited content list indicating partial content data the viewing of which is allowed on the reproduction device 30 (S618). On the other hand, when it is determined by the parental level judging section 238 that no age restriction is applied to the reproduction device 30, the transmission control section 240 transmits a content list indicating all the content data (S620).

Next, when requested by the reproduction device 30 for reproduction, that is transmission, of content data (S624), the transmission control section 240 judges whether or not age restriction is set on the requested content data (S628). If age restriction is set on the content data, and if it is lower than the age restriction set for the reproduction device 30, the transmission control section 240 transmits the content data to the reproduction device 30 (S632). On the other hand, if it is judged by the parental level judging section 238 that no age restriction is applied to the reproduction device 30, the transmission control section 240 transmits the requested content data to the reproduction device 30 (S636).

Figure 14:
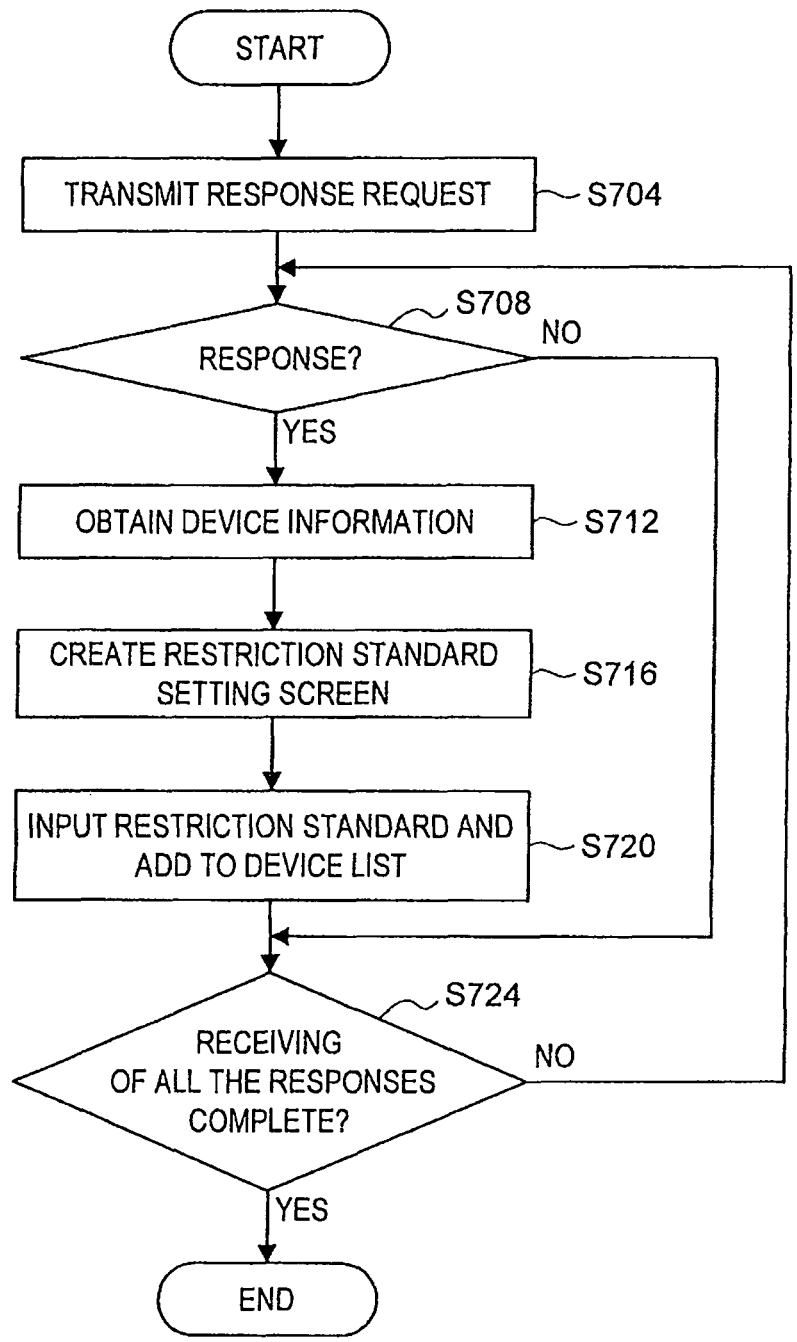
FIG. 14 is a flow chart showing a flow until the content recording device obtains a device list.

FIG. 14 is a flow chart showing a flow until the content recording device 20 obtains a device list. First, the content recording device 20 broadcasts a response request within the home network 1 (S704). Then, when there is a response to the response request (S708), the content recording device 20 obtains the device information of the reproduction device 30 which is the origin of the response (S712). Further, the display screen creating section 232 creates a restriction standard display screen based on the obtained device information (S716).

Further, the standard setting section 234 adds the device information including the restriction standard input by the user to the device list (S720). Then, when all the responses to the response request transmitted in S704 are received, the content recording device 20 terminates the process (S724). Note that, in FIG. 14, although an example is described where the restriction standard display screen is created for each reproduction device 30, the restriction standard display screen 60 including all the reproduction devices may be created as shown in FIG. 7.

(6) Conclusion

As described above, according to the present embodiment, the standard for the age restriction to be applied to the reproduction device 30 can be determined according to the ON-OFF state of other reproduction devices 30. Accordingly, even if the user of the reproduction device 30 is not specified, viewing of content data can be appropriately restricted for each user.

For example, when the users of the reproduction device 30C are specified to be parents and the power of the reproduction device 30C is ON, it is highly probable that the user of the reproduction device 30A at the time is a child. In this case, as described above, with the parental level judging section 238 lowering the upper limit of parental level on content data the viewing of which is allowed on the reproduction device 30A, children can be effectively protected from inappropriate content data.

Further, when the users of the reproduction device 30B are specified to be children and the power of the reproduction device 30B is ON, it is highly probable that the user of the reproduction device 30A at the time is a parent. In this case, as described above, with the parental level judging section 238 raising the upper limit of parental level on content data the viewing of which is allowed on the reproduction device 30A, it can be prevented that the parent is overly restricted from viewing content data.

It should be understood by those skilled in the art that various modifications, combinations, sub-combinations and alterations may occur depending on design requirements and other factors insofar as they are within the scope of the appended claims or the equivalents thereof.

For example, in the above-described embodiment, a description is made with emphasis on the example of setting restriction standard for each reproduction device 30. However, it is also possible to change the restriction standard set for each reproduction device 30. When a change of the restriction standard is requested by the user, the standard setting section 234 of the content recording device 20 may read out a device list from the storage section 250, and the display screen creating section 232 may create a restriction standard display screen based on the device list.

Further, in the above-described embodiment, an example is described where, when the power of a certain reproduction device 30 is ON, a predetermined age restriction is applied to another reproduction device. However, the present invention is not limited to such an example. For example, when the power of a certain reproduction device 30 is OFF, a predetermined age restriction may be applied to another reproduction device.

Further, the content recording device 20 may further set a basic age restriction to be applied to each reproduction device 30 based on an operation of the user. Further, the restricting time slot where the age restriction is applied may also be set based on an operation of the user. With such a configuration, the standard for the age restriction for content data the viewing of which is to be allowed or restricted may be flexibly changed for a certain reproduction device 30 according to time, and thus, even if the user of the reproduction device 30 is not specified, viewing of content data can be appropriately restricted for each user.

Further, when a plurality of restriction standards are set for the reproduction device 30 and the plurality of restriction standards are simultaneously applied, order of superiority of the plurality of restriction standards may be set beforehand. For example, if the restriction standard "R14 when TV in living room is ON" is superior to the restriction standard "R20 when TV in children's room is ON", when the reproduction device 30B and the reproduction device 30C are ON at the same time, R14 may be applied to the reproduction device 30A.

Or, the restriction standard that met the condition first or the restriction standard that met the condition afterwards may be given priority. For example, when the TV in bedroom (reproduction device 30C) is turned on after the TV in children's room (reproduction device 30B) is turned on, the restriction standard "R14 when TV in bedroom is ON" may be given priority over the restriction standard "R20 when TV in children's room is ON."

Or, the restriction standard with stricter age restriction among the plurality of restriction standards may be given priority. For example, among the restriction standard "R14 when TV in bedroom is ON" and the restriction standard "R20 when TV in children's room is ON", the restriction standard "R14 when TV in bedroom is ON" may be given priority. Similarly, the restriction standard with looser age restriction among the plurality of restriction standards may be given priority. For example, among the restriction standard "R14 when TV in bedroom is ON" and the restriction standard "R20 when TV in children's room is ON", the restriction standard "R20 when TV in children's room is ON" may be given priority.

Further, the respective steps of the processing of the home network 1 according to this specification do not necessarily have to be performed in a temporal sequence in the order shown in the flow charts or the sequence diagrams. For example, the respective steps of the processing of the home network 1 may also be performed in parallel or individually (for example, in parallel processing or processing according to an object).

It is also possible to create a computer program that will cause the CPU 230 of the content recording device 20 to function, in cooperation with the hardware, such as the ROM, the RAM, and the like, as the display screen creating section 232, the standard setting section 234, the state detecting section 236, the parental level judging section 238, and the transmission control section 240. A storage medium storing the computer program may also be provided. Further, a series of processes by the content recording device 20 can be implemented in hardware by configuring as hardware the display screen creating section 232, the standard setting section 234, the state detecting section 236, the parental level judging section 238, and the transmission control section 240.

What is claimed is:

1. A content transmission device that is connected to a plurality of external devices including a reproduction device reproducing content data, comprising:
    a transmitting section transmitting content data to the reproduction device;
    a detecting section detecting the state of each of the plurality of external devices;
    a parental level determining section determining for the reproduction device a boundary between a parental level on content data the viewing of which is restricted and a parental level on content data the viewing of which is allowed according to the state of each of the plurality of external devices detected by the detecting section; and a control section controlling transmission of content data from the transmitting section based on the relation between the boundary determined by the parental level determining section and a parental level set on content data, wherein the boundary for the reproduction device is set through a graphical user interface comprising a target device selection display, a target device state selection display, and an age restriction display, wherein multiple restriction standards are set for the reproduction device using respective restriction standard setting screens, access to a restriction standard setting screen requiring an authentication process including integrated circuit (IC) card authentication.

2. The content transmission device according to claim 1, wherein
the parental level determining section lowers the boundary for the reproduction device when the power of the other reproduction device is detected by the detecting section to be ON.

3. The content transmission device according to claim 1, wherein
the parental level determining section raises the boundary for the reproduction device when the power of the other reproduction device is detected by the detecting section to be ON.

4. The content transmission device according to claim 1, wherein
the external device includes the reproduction device and an optical sensor sensing light;
the detecting section detects the sensed state of light by the optical sensor; and
the parental level determining section determines the boundary for the reproduction device according to the sensed state of light detected by the detecting section.

5. The content transmission device according to claim 1, wherein
the parental level determining section further determines the boundary for the reproduction device according to a current time.

6. The content transmission device according to claim 1, wherein
the content transmission device further comprises an input section to which a determination standard of the parental level determining section for the boundary is input by a user; and
the parental level determining section determines the boundary for the reproduction device based on the determination standard input to the input section.

7. A non-transitory computer-readable medium having a computer-readable program stored thereon, the program causing a computer provided in a content transmission device which is connected to a plurality of external devices including a reproduction device reproducing content data and which comprises a transmitting section transmitting content data to the reproduction device to function as:
a detecting section detecting the state of each of the plurality of external devices;
a parental level determining section determining for the reproduction device a boundary between a parental level on content data the viewing of which is restricted and a parental level on content data the viewing of which is allowed according to the state of each of the plurality of external devices detected by the detecting section; and
a control section controlling transmission of content data from the transmitting section based on the relation between the boundary determined by the parental level determining section and a parental level set on content data, wherein the boundary for the reproduction device is set through a graphical user interface comprising a target device selection display, a target device state selection display, and an age restriction display, wherein multiple restriction standards are set for the reproduction device using respective restriction standard setting screens, access to a restriction standard setting screen requiring an authentication process including integrated circuit (IC) card authentication.

8. A parental level determination method executed by a content transmission device which is connected to a plurality of external devices including a reproduction device reproducing content data, comprising the steps of:
detecting the state of each of the plurality of external devices;
determining for the reproduction device a boundary between a parental level on content data the viewing of which is restricted and a parental level on content data the viewing of which is allowed according to the state of each of the plurality of external devices; and
controlling transmission of content data from the transmitting section based on the relation between the determined boundary and a parental level set on content data, wherein the boundary for the reproduction device is set through a graphical user interface comprising a target device selection display, a target device state selection display, and an age restriction display, wherein multiple restriction standards are set for the reproduction device using respective restriction standard setting screens, access to a restriction standard setting screen requiring an authentication process including integrated circuit (IC) card authentication.

9. A content transmission system including a plurality of external devices including a reproduction device reproducing content data and a content transmission device that is connected to the plurality of external devices, wherein
the content transmission device comprises:
a transmitting section transmitting content data to the reproduction device;
a detecting section detecting the state of each of the plurality of external devices;
a parental level determining section determining for the reproduction device a boundary between a parental level on content data the viewing of which is restricted and a parental level on content data the viewing of which is allowed according to the state of each of the plurality of external devices detected by the detecting section; and
a control section controlling transmission of content data from the transmitting section based on the relation between the boundary determined by the parental level determining section and a parental level set on content data, wherein the boundary for the reproduction device is set through a graphical user interface comprising a target device selection display, a target device state selection display, and an age restriction display, wherein multiple restriction standards are set for the reproduction device using respective restriction standard setting screens, access to a restriction standard setting screen requiring an authentication process including integrated circuit (IC) card authentication.

* * * * *